Oct. 15, 1940.  T. NASSOS  2,218,212
GLOBE CABINET
Filed Aug. 31, 1937  2 Sheets-Sheet 1

INVENTOR.
THOMAS NASSOS
BY Arlington L. White
ATTORNEY

Oct. 15, 1940.  T. NASSOS  2,218,212
GLOBE CABINET
Filed Aug. 31, 1937  2 Sheets-Sheet 2
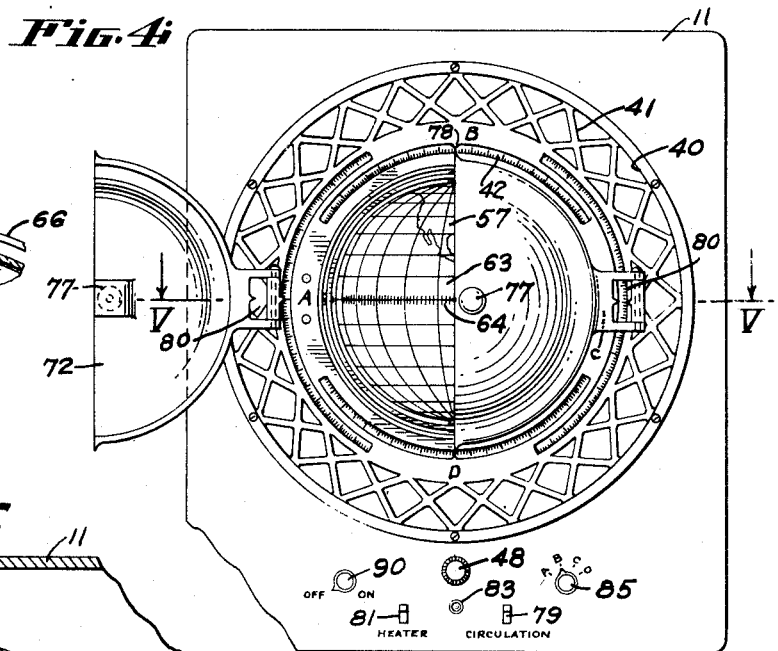
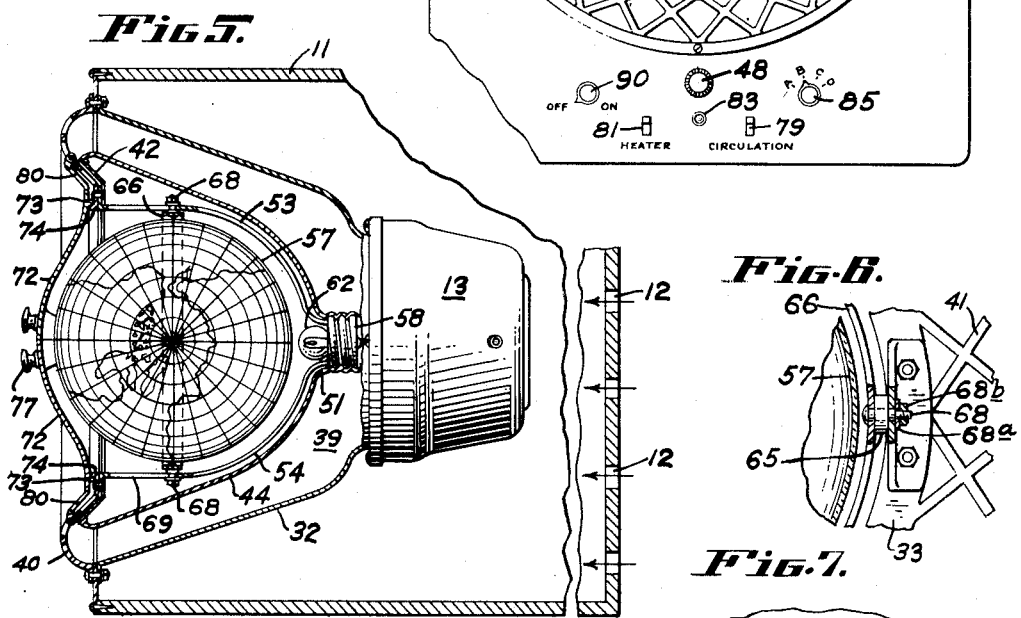
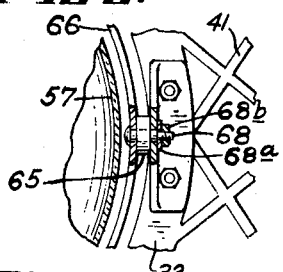
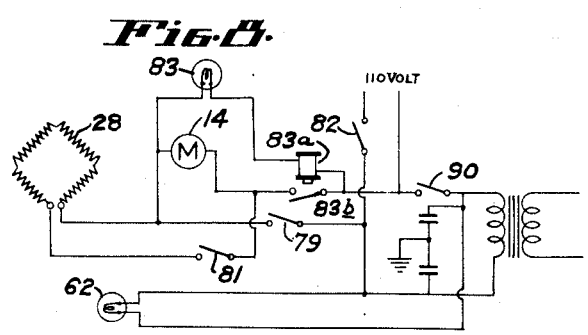
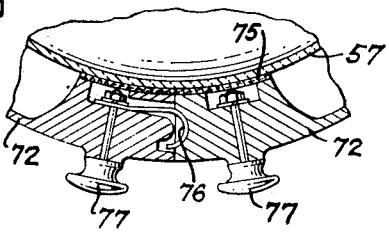
INVENTOR.
THOMAS NASSOS
BY Arlington E. White
ATTORNEY Patented Oct. 15, 1940

2,218,212

UNITED STATES PATENT OFFICE 2,218,212

GLOBE CABINET

Thomas Nassos, San Francisco, Calif.

Application August 31, 1937, Serial No. 161,793

5 Claims. (Cl. 35—46)

The invention, in general, relates to educational devices. More particularly, the invention relates to means for adjustably mounting and housing a globe permitting bringing the same to visibility for manipulation and inspection.

While the combination of my invention is entirely suitable for adaptation to a variety of types of cabinets and for use in educational institutions for classroom discussion and instruction, I have especially designed the present embodiment of the invention for adaptation to radio receiving set cabinets and have illustrated the invention, and shall hereinafter describe the same in that environment.

One of the principal objects of my invention is to provide a unitary structure in a cabinet affording the mounting of a globe therein which is readily brought into visibility and readily returned within the cabinet.

Another object of the invention is to provide in structural combination with a radio receiving set cabinet a globe enabling the user of the set to locate readily on the globe the location from which a radio message is being broadcast by merely manipulating the globe manually on its mounting.

A still further object of the invention is to provide a cabinet and globe combination which is compact and relatively inexpensive to install.

While I have shown a preferred embodiment of my invention in the accompanying drawings, it is to be understood that I am not to be limited to the embodiment shown, as my invention, as defined in the appended claims, can be embodied in a plurality and variety of forms.

Referring to the drawings:

Figure 4 is a front elevation, on a reduced scale, of an embodiment of the invention installed in a radio receiving cabinet, the view showing one door of the cabinet in open position and the other door in closed position.

Figure 5 is a plan view, partially in section, taken on the line V—V of Figure 4.

Figure 6 is an enlarged detail showing the means for pivotally mounting the globe of the unit.

Figure 7 is an enlarged detail illustrating a preferred type of door latch for the doors of the cabinet.

Figure 8 is a wiring diagram showing the electrical connections requisite for the operation of various elements of the unit.

Figure 9 is an enlarged fragmentary view showing the means for mounting the globe of the unit on a universal connection.

In its preferred form, the combination of my invention, as adapted to a cabinet including a front panel and doors hingedly connected to such panel, preferably comprises a bar secured to the front panel and extending within the cabinet, a light reflector on said bar, a transparent strip extending from said reflector through which light rays reflected from said reflector may be transmitted and diffused, a globe movably mounted on said bar for movement thereon out of and into the cabinet upon opening and closing of the doors of the cabinet, and means including said reflector and said transparent strip for illuminating said globe when out of the cabinet.

Figure 1:
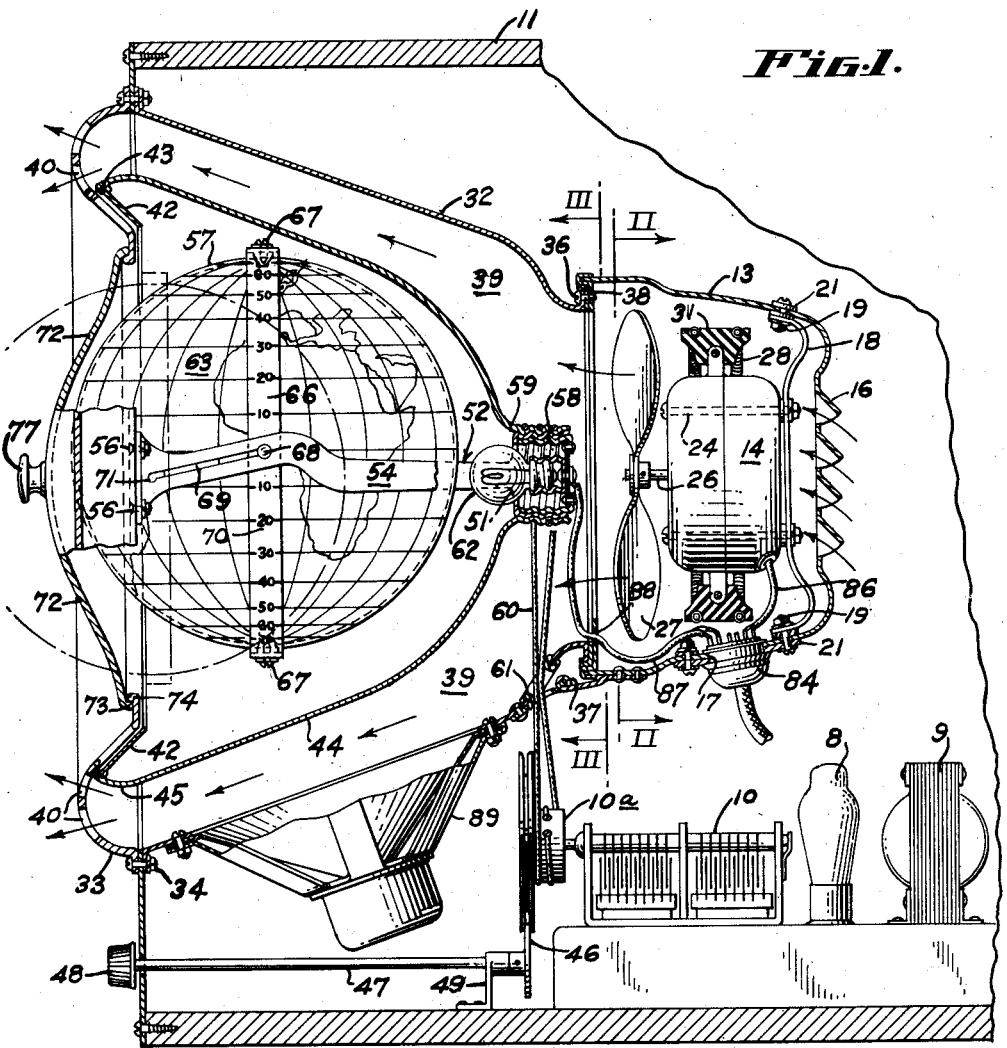
Figure 1 is a side elevation in vertical section of an embodiment of the invention as installed in a radio receiving set.
Figure 2:
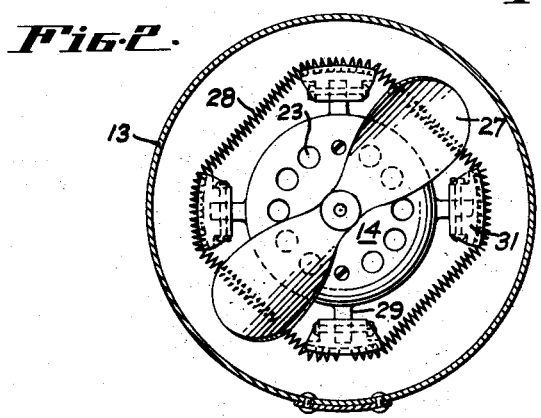
Figure 2 is a cross-sectional view taken on the line II—II of Figure 1.
Figure 3:
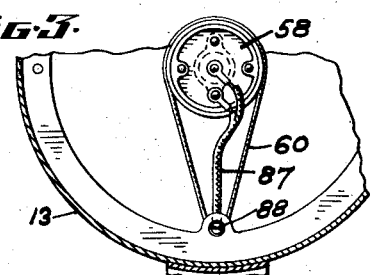
Figure 3 is a fragmentary cross-section of the unit, taken on the line III—III of Figure 1.

In Figures 1 and 5 of the drawings, I have shown an embodiment of my invention installed in a radio receiving set cabinet 11 having the usual grill openings 12 in the rear wall thereof and in which are installed the requisite tubes 8, transformer 9, and tuning condenser 10 for the set. While my preferred embodiment of the invention may be combined with conventional radio receiving sets, I have illustrated the invention as embodied in a radio receiving set cabinet that includes means for supplying heat to the room in which the cabinet is disposed, together with means therein for circulating warm or hot air, although these portions of such set are not, per se, claimed herein. As illustrated, the radio receiving set cabinet may include a casing 13 for housing a motor 14 of relatively low horse-power output; the casing being formed with louvres 16 in the rear wall thereof, for air circulation, as well as an opening 17 in the lower wall thereof for the reception of a plug and socket connection. The motor 14 conveniently is supported on a curved bar 18 connected to opposite walls of the casing 13 by bolts 19 and suitable flexible fibre washers 21 to dampen vibration. The front and rear plates of the shell of motor 14 are formed with vents 23 therein, for air circulation; the plates being fastened together by bolts 24 which also support the motor. The motor shaft 26 extends forwardly and carries a fan or propeller 27 of such shape and pitch as to afford optimum performance at a minimum of sound. With motor 14 in operation, a constant circulation of air between the set and the room in which it is disposed is had and the rapid movement of air created by the fan effects a cooling of the air in the room as well as in the set. The means for supplying heat to the room in which the set is disposed also are not, per se, claimed herein. These means include a heating element 28 supported on rods 29 extending from the motor 14, each rod being provided with a porcelain insulator 31. For supporting casing 13 and for guiding air currents from the cabinet, a horn 32 is provided and conveniently is fastened to the front panel 33 of the cabinet by suitable attaching elements, such as the bolts 34, with a gasket interposed between the panel and the horn to dampen vibration. The rear of the horn 32 communicated with the interior of the casing 13 and is connected thereto by screws 36 and a hinge connection 37. A gasket 38 is provided between the horn and the casing 13 to insure a tight fit and also to assist in dampening vibrations. The hinge connection 37 affords ready access to the motor and heating element without disturbing other elements of the set. The horn 32, together with a reflector hereinafter described, defines a passageway 39 through which warm and hot air currents pass from the cabinet 11 through openings 40 formed in the front panel 33 thereof. In the cabinet depicted, the opening 40 is faced with a grill 41 which, of course, may be of any desired design motif.

In accordance with my invention, I provide means for movably supporting a globe within the cabinet 11 whereby the globe may be brought to visibility readily outside of the cabinet and moved as readily within the cabinet for retention therein, together with means for illuminating the globe when out of the cabinet which include a light reflector and a transparent strip 42 on the reflector. The transparent strip 42 may include grouped markings defining a dial and the groupings may be arranged, as desired, depending upon the band switch arrangement of the radio receiving apparatus; the dial depicted herein not being, per se, claimed herein. The transparent strip 42 is connected by any suitable means, such as by screws 43, to the light reflector 44, and the strip preferably is disposed in an inclined position with respect to the reflector so as effectively to receive light rays therefrom and to pass the rays onto a globe hereinafter described. The reflector 44 is shaped to a curvature for best illumination of the globe and preferably is rounded, as indicated by the reference numeral 45, adjacent the transparent strip 42 for concentrating light rays thereon. In the dial illustrated on transparent strip 42, four groupings are set out, indicated generally by the reference letters A, B, C and D in Figure 4 of the drawings and includes a general or ordinary broadcast band together with three or more shortwave bands of which the latter occupy the outer portion of the strip as more space is required for the higher frequencies. In accordance with standard sets, the drum 10A is actuated by a friction disc 46 secured to shaft 47 which extends through front panel 33 of the cabinet and which conveniently may be manipulated by hand knob 48, the shaft 47 conveniently being journaled in a bracket 49 secured to the floor of the cabinet.

As illustrated in Figures 1 and 5 of the drawings, the reflector 44 is revolvably mounted on the rear portion 51 of a yoke-bar 52 having a pair of inclined arms 53 and 54 which are supported, preferably by means of countersunk screws 56, on the front panel 33 of the cabinet. The yoke-bar 52 preferably is fabricated of aluminum and gradually tapers so as not to interfere appreciably with reflection of light rays onto the dial strip and globe. The bar 52 not only revolvably supports reflector 44 on which the dial strip 42 is carried but also supports a mapped globe 57 as well as a lamp socket 58. To effect the revolvable mounting of the reflector on the bar 52, the rear portion 51 of the bar is externally grooved for cooperation with internal grooves provided on the narrow end 59 of the reflector 44 which is also externally grooved to accommodate the turning cable 60 which enters through a grommet 61 provided in the horn 32. To provide a suitable mounting for lamp socket 58, the rear portion of yokebar 52 is internally grooved for cooperation with external grooves on the lamp socket. A relatively small lamp 62 of the standard type is provided for threaded engagement with lamp socket 58 and clearance is provided between the yoke-bar 52 and lamp socket 58 to enable the ready removal of the lamp 62 from the rear. Preferably, the lamp socket 58 is secured on a base of insulation material to prevent transmission of current to the yoke-bar 52. The candle-power of lamp 62 shall be sufficient so that, with the aid of reflector 44 and the inclined mounting of dial strip 42, the dial as well as globe 57 in its forwardly protruding position, as later described, will be effectively illuminated.

As stated above, the aluminum supporting bar 52 which supports the reflector 44 and light socket 58 also supports the globe 57. The globe is conveniently provided with map delineations 63 exhibiting the various continents and countries of the world and also may be provided with markings, not shown, of the call letters of various broadcasting stations as well as time zones, also not shown. Moreover, if desired, the globe 57 may be marked with various other delineations for the convenience of the user and can include, for example, distances, important airways and shipping routes. I have also provided the globe with markings 64 indicating degrees of longitude. While any size of globe can, of course, be utilized and the associated elements dimensioned in proportion thereto, I have found that a globe approximating 6 to 7 inches in diameter will suffice to adequately serve the user. To insure optimum light reflection, as well as pleasing optical effects, I preferably fabricate the globe 57 of transparent material.

In accordance with the invention, the globe 57 is mounted for rotation about both its horizontal and its vertical axis, thereby providing for rapid studying of its mapped surface, and also is slidably mounted for movement in and out of the cabinet 11. The preferable mounting for the globe 57 is particularly illustrated in Figures 6 and 9 of the drawings and includes an annulus or ring 66 which encircles the globe and rotates therewith. As shown, the ring 66 is supported in spaced relationship with respect to the globe and is connected by means of spacer blocks 65 and pins 68 to the inclined arms 53 and 54 of yokebar 52. As illustrated in the drawings, the pins 68 slide in elongated slots or tracks 69 formed in the inclined arms 53 and 54 of bar 52 thus enabling the globe 57 to move back and forth along the tracks 69 as well as to be revolved about its horizontal axis. Washers 68A, which are held upon pins 68 by nuts 68B, can be provided in various thicknesses for controlling the smoothness of movement of the globe 57 along tracks 69 and its rotation about its horizontal axis on pins 68. The mounting means for the globe 57 also includes combination spacer-blocks and pivot pins 65a, the lower, narrow portions of which pierce the globe on its vertical axis and extend into the globe sufficient distances to serve as pivots. The spacer-blocks 65a conveniently are secured to the annulus or ring 66 by means of screws 67. Spacer-blocks 65a are made to a thickness that will afford clearance between screws 67 and reflector 44 as well as between screws 67 and lamp 62 and front panel 33. Thus, I have provided means for enabling rotation of the globe not only about its horizontal and vertical axes but movement of the globe along tracks 69 from inner ends of the tracks to outer ends thereof, at which points the tracks 69 are provided with notches 71 in which the globe 57 comes to rest. Due to the inclined arms 53 and 54 and the provision of the inclined tracks 69 therein, the globe 57 slides gently into view in front of the cabinet when the doors of the cabinet are opened and comes to rest in the notches 71 of the tracks. Normally, the globe will protrude from the surface of the front panel 33 of the cabinet, when resting in the notches 71 of tracks 69, a sufficient distance so that approximately one-half of its superficial area is exposed thus enabling a user clearly to study the entire mapped surface as the globe can be revolved about both its horizontal and its vertical axis. Manual manipulation of the globe in studying its mapped surface will not unseat the globe from the notches 71 because the small weight of the globe and the depth of notches 71 off set the normal pressure of the hands in manipulating the globe. As indicated particularly in Figure 1 of the drawings, the outer surface of the annulus or ring 66 is provided with markings 70 of the degrees of latitude.

The cabinet 11 for housing the radio or television set preferably is provided with small doors 72 molded from a phenolic condensate and hinged upon front panel 33 of the cabinet. It is to be observed that upon a closing of the doors 72 the globe 57 is urged gently up the inclined tracks 69 and held by the doors against the rear ends of the tracks whereas, upon opening the doors, the globe slides gently down the tracks 69 again for observation. Each of the doors 72 preferably is provided around its edge with a bead 73 for engagement with a bead 74 provided around the edge of the front panel 33 of the cabinet. The engagement of beads 73 with the bead 74 holds the doors more firmly in place when shut. A strip 76 of resilient material, such as spring metal, is provided for effectively latching the doors in closed position. The bead 74 on panel 33 provides a pleasing finish and appearance when the globe is protruding therefrom. In order to prevent marring of the surface of globe 57 when the doors 72 are closed upon it, those portions of the doors which contact the globe are lined with soft cushioning material 75, such as pieces of felt. As shown, each of the doors conveniently is provided with a knob 77 and, as indicated in Figure 4 of the drawings, the doors 72 are curved at the top and bottom and terminate in points, as at 78, thereby providing, in effect, dial pointers for convenient reading of the dial 42. The doors are provided with suitable openings 80 so that the dial may be read when the doors are in closed position.

A suitable circuit arrangement for the unit of my invention and for the set is diagrammatically illustrated in Figure 8 of the drawings and it is to be understood that the unit of this invention may be built for operation either with alternating or direct current, thereby enabling its connection into either source of current which may be available. The circuit includes a switch 79, marked "Circulation" and located conveniently on the front panel 33 of the cabinet. Switch 79 controls the energization of motor 14 and with this switch open neither the motor nor the heater will be energized. A second switch 81, marked "Heater," is mounted on the front panel 33 of the cabinet and is interposed in the motor circuit. In addition to the foregoing, the circuit includes a master switch 82 as a safety precaution for cutting off all current to the set. The switch 82 preferably is mounted on the cabinet out of sight. The circuit also includes a caution or signal lamp 83 which may conveniently be colored and which is mounted in plain view on panel 33, as indicated in Figure 4 of the drawings, and also includes means, such as an electro-magnet 83A for operating a mercury switch 83B, for interrupting current flow to the motor and heater whenever the bulb or lamp 83 burns out. The wiring for the circuit preferably enters the set through plug and socket connection 84 fitted in opening 17 of casing 13. The wiring includes a conductor 86 leading to motor 14 as well as conductor 87 leading through an opening 88 in the casing 13 to lamp socket 58. Conductor 87 is formed to a length that will permit it to be slackened appreciably when the casing 13 is swung back from the horn 32 and the location of opening 88 in casing 13 is such that the cord 87 can not come in contact with the fan or propeller 27 nor become frayed. As shown in Figure 8 of the drawings, the circuit also includes a volume-control switch 90 and this switch may conveniently be utilized for controlling dial light 62, as indicated. Switch 90 also is mounted on the front panel 33 of the cabinet and I also provide a hand knob 85 on the panel 33 to enable ready selection of dial wave lengths. The panel 33 is provided with reference letters A, B, C and D about the knob 85 corresponding to the various wave-length groupings on dial strip 42.

It will be clear from the foregoing described circuit arrangement that closing of switch 79, or turning the same to "on" position after first having thrown main switch 82 to "on" position, the warm air generated in the set is drawn, by the action of fan 27, through the louvres 16 of the casing and then guided or emitted from the set through passageway 39 and opening 40 in front panel 33 of the cabinet. Horn 32 and reflector 44 guide the conducted air. Since the cabinet is provided at its rear with grill openings, as at 12, air from the room also is drawn into the set and the constant circulation of the warm air from the set and the cooler air from the room rapidly cools the air being circulated. In the event that it is desired to heat the room, it is only necessary to close switch 81, or throw the same to "on" position and the heater 28 becomes energized, of course after first having closed the master and motor switches. The hot air is conducted into the stream of warm circulating air by the fan 27 and the room rapidly becomes heated. It also is to be observed that the closing of switch 79 energizes lamp 83 and also electro-magnet 83A to close mercury switch 83B thus completing the circuit. Should a user of the set open switch 81 only to turn off heater 28, lamp 83 remains lighted as it is in the motor circuit. If switch 79, however, is opened or thrown to "off" position, the lamp is extinguished and, moreover, the heater also is shut off as the heater is in the motor circuit. Thus, I have provided an effective means for preventing the operation of the heater if the motor is not in operation. Moreover, if it may happen that the bulb 83 burns out, there will be no likelihood of damage for no current will flow to the electro-magnet 83A and consequently mercury switch 83B will open and interrupt current flow to the motor 14. Since the heater 28 is in the motor circuit, no current likewise will flow to it upon a burning out of lamp 83.

The unit of my invention can be adapted for installation in any size radio or television set, it being only necessary to proportion the size of the elements for the space available in the cabinet of the set. Moreover, a number of speakers can be utilized, if desired, or speakers can be limited to one. If a number of speakers are employed, they can readily be mounted on the sides as well as the bottom of horn 32 and placed in communication with passageway 39 for emission of sound through opening 40. In the embodiment of the invention shown in the drawings, I have placed but one speaker in combination with the unit and conveniently have mounted the speaker 39 on the bottom of horn 32 in communication with passageway 39. With the speakers working against a large column of air in passageway 39, the gentle, rounded curvatures of horn 32 and reflector 44, together with the provision of gaskets between the horn and casing 13 and between the horn and front panel 33 to deaden vibrations, affords almost perfect acoustics.

I claim:

1. In a cabinet, a front panel, a pair of doors hingedly connected to said panel; said doors being adapted to be opened and closed, a bar secured to said panel and extending within said cabinet, a light reflector on said bar, a transparent strip extending from said reflector through which the light rays reflected from said reflector may be transmitted and diffused, a globe slidably mounted on said bar for movement thereon out of and into said cabinet upon opening and closing said doors, and means including said reflector and said transparent strip for illuminating said globe when out of said cabinet.

2. In a cabinet having bottom, side, end and top walls and a front door, a light reflector in said cabinet, a transparent strip extending from said reflector and through which light rays reflected from said reflector may be transmitted and diffused, a bar supported within said cabinet, a globe slidably mounted on said bar for movement thereon through the doorway of said door out of and into said cabinet, and means including said reflector and said transparent strip for illuminating said globe when out of said cabinet.

3. In a cabinet, a front panel, doors hingedly connected to said panel for opening and closing the same, a supporting bar secured to said panel and extending within said cabinet, and a globe mounted on said bar for rotation about its horizontal and vertical axes as well as for slidable movement thereon into and out of said cabinet; said globe being adapted to be moved into said cabinet by said doors in the operation of closing the same and to be held within said cabinet by said doors on said supporting bar and also being adapted automatically to slide out of said cabinet upon opening said doors.

4. In a cabinet, a front panel, doors hingedly connected to said panel, a globe, and means for supporting said globe for slidable movement into and out of said cabinet; said globe being adapted to be moved into said cabinet by said doors in the operation of closing the same and to be held within said cabinet by said doors and also being adapted automatically to slide out of said cabinet to protrude partially beyond said panel upon opening said doors.

5. In a cabinet, a front panel, a pair of doors hingedly connected to said panel for opening and closing the cabinet, a yoke-bar secured to said panel and extending within the cabinet; said bar including a pair of spaced, inclined arms each having a slot therein, and a globe slidably mounted on said arms for movement along said slots into and out of the cabinet, said globe being adapted to be moved into said cabinet on said arms by closing said doors and being adapted automatically to slide out of the cabinet on said arms upon opening said doors.

THOMAS NASSOS.